United States Patent [19]

Larson et al.

[11] Patent Number: 5,041,325

[45] Date of Patent: Aug. 20, 1991

[54] MICROWAVE FOOD PACKAGE AND GREASE ABSORBENT PAD THEREFOR

[75] Inventors: Curtis L. Larson; Pierre H. LePere, both of St. Paul, Minn.

[73] Assignee: Minnesota Mining and Manufacturing Company, St. Paul, Minn.

[21] Appl. No.: 364,162

[22] Filed: Jun. 12, 1989

Related U.S. Application Data

[60] Division of Ser. No. 82,421, Aug. 10, 1987, Pat. No. 4,873,101, which is a continuation-in-part of Ser. No. 780,219, Sep. 26, 1985, abandoned.

[51] Int. Cl.$^5$ .............................................. B32B 3/00
[52] U.S. Cl. .................................... 428/156; 428/171; 428/138; 156/159; 156/167; 219/10.55 E; 426/129; 426/234
[58] Field of Search ................... 428/171, 138, 68, 76, 428/296, 903, 913, 36.4, 297, 102, 283, 36.92, 373, 156; 156/159, 167, 172; 219/10.55 E; 426/234, 129

[56] References Cited

U.S. PATENT DOCUMENTS

| | | | |
|---|---|---|---|
| 4,042,740 | 8/1977 | Krueger | 428/138 |
| 4,103,058 | 7/1978 | Humlicek | 428/171 |
| 4,463,121 | 7/1984 | Gartland et al. | 428/36.92 |
| 4,551,377 | 11/1985 | Elves et al. | 426/129 |
| 4,572,852 | 2/1986 | Gartland et al. | 428/36.92 |
| 4,681,801 | 7/1987 | Eian et al. | 428/283 |
| 4,737,394 | 4/1988 | Zafiroglu | 428/102 |
| 4,740,377 | 4/1988 | Dawes et al. | 426/234 |
| 4,748,069 | 5/1988 | Cullen | 428/76 |
| 4,851,273 | 7/1989 | Brown, Jr. | 428/76 |

*Primary Examiner*—James J. Seidleck
*Assistant Examiner*—J. Weddington
*Attorney, Agent, or Firm*—Gary L. Griswold; Walter N. Kirn; Leland D. Schultz

[57] ABSTRACT

A package of food containing a substantial amount of water and solidified grease that can be cooked within the package in a microwave oven. A pad adjacent the food comprises microwave radiation transparent generally hydrophobic liquid grease absorbing materials that are capable of holding the amount of grease in the food when it is melted; and a vapor tight microwave radiation transparent enclosure surrounding the pad and food includes means for venting steam from the enclosure as the food is cooked. Preferably, the pad is produced from microfibers constructed of a composition comprising a blend containing substantially equal parts by weight of propylene and poly 4-methylpentene-1.

7 Claims, 5 Drawing Sheets

MICROWAVE FOOD PACKAGE AND GREASE ABSORBENT PAD THEREFOR

CROSS REFERENCE TO RELATED APPLICATION

This application is a divisional of Ser. No. 082,421, now U.S. Pat. No. 4,873,101 which is a continuation-in-part of co-pending U.S. patent application Ser. No. 780,219 entitled "Microwave Food Package" filed on Sept. 26, 1985, now abandoned.

TECHNICAL FIELD

This invention relates to grease absorbing pads and to packages in which food containing a large amount of grease and water may be cooked by a microwave oven.

BACKGROUND ART

Foods, particularly precooked and cured foods such as bacon, sausage, ham, or bologna that contain a large amount of water and solidified grease, can cause problems when cooked in a microwave oven. Water in such foods is vaporized by contact with the heated melting grease as the food cooks, causing tiny explosions that can splatter portions of the grease around the oven. Thus, persons who cook such food in microwave ovens typically place the food on a pan that can collect the melted grease and cover the food with several layers of paper towels to restrict such splattering.

While many specially designed cooking structures have been suggested to minimize the grease collecting and/or splattering problems, known cooking structures for use in microwave ovens have required special care to avoid spilling the collected grease after the cooking is complete.

It is known to place a liquid absorbent pad within a package for absorbing food byproducts such as moisture and grease exuded from food during cooking in a microwave oven. Such pads must not only provide sufficient capacity for the quantity of food byproducts produced during cooking, but must withstand the elevated temperatures required to adequately cook the precooked or cured foods discussed above without degradation. Preferably, such a pad should be placed directly adjacent the food within the package for most effective activity during cooking.

However, conventional absorbent pads absorb both water and various greases from the food. This is undesirable in that if part of the absorbent capacity of the pad is occupied by moisture, insufficient capacity may remain for grease. Alternatively, the capacity of the pad must be increased by increasing the size and weight of the pad, at additional expense.

It is also desirable in many cases for water exuded from a food in the form of steam during cooking to be maintained in close proximity to the food so as to evenly distribute heat within the package and to reduce the cooking time for the food. An additional problem occurs during extended storage and transportation of a package containing a food having substantial amounts of water and grease. A pad that absorbs water as well as grease will tend to gradually absorb water from the food. Thus, a subsequent measurement will show that the weight of the food has been reduced compared to the weight at the time the package was sealed.

DISCLOSURE OF INVENTION

The present invention provides a grease absorbing pad for use such as in a package for a substance or food containing a substantial amount of water and solidified grease that is to be cooked in a microwave oven, which package prevents splattering of the grease onto the inside of a microwave oven, collects the grease during the cooking process, does not require special handling to preclude spilling the collected grease after the substance or food has been cooked, and is easy to manufacture. The present invention also provides for use of the pad outside of a package containing the food, if desired.

According to the present invention there is provided a package for use in a microwave oven, the package for use with precooked and cured foods containing a substantial amount of water and solidified grease (e.g., bacon, sausage, ham or bologna); a pad for use in the package adjacent the food comprising microwave radiation transparent and generally hydrophobic grease absorbing microfibers constructed of a composition comprising a blend containing substantially equal parts by weight of polypropylene and poly 4-methylpentene-1 (PMP) and capable of holding at least the amount of grease in the food after it has melted; and a vapor tight microwave radiation transparent enclosure surrounding the pad and food. Alternatively, the generally hydrophobic grease absorbing pad may be provided for use in a microwave oven independently of the package herein described. Other materials may be included in the composition of the microfibers as long as the other materials do not adversely affect the generally hydrophobic, grease absorbing properties of the microfibers.

Preferably the pad is produced from blown microfibers made in accordance with the teachings in U.S. Pat. Nos. 4,103,058 and 4,042,740 (incorporated herein by reference) so that the pad has a network of compacted high density regions and pillowed low density regions that form a field of generally dome-like members on the apexes of which the food is supported. The blown microfibers may be of polypropylene, however, blown microfibers of polyester, polymethylpentene or polyethylene, or blends of any of the preceding materials may also be useful. Most preferably, the pad is produced from blown microfibers constructed of a composition comprising a blend containing substantially equal parts by weight of polypropylene and poly 4-methylpentene-1 (PMP).

A single pad may be used, or multiple pads may be bonded together with the pad adjacent the food produced from microfibers constructed of a composition comprising a blend containing substantially equal parts by weight of polypropylene and poly 4-methylpentene-1 (PMP). One or more of the pads remote from the food may be constructed of generally hydrophobic grease absorbing materials as disclosed in co-pending U.S. patent application Ser. No. 780,219 entitled "Microwave Food Package".

Pads of polypropylene blown microfibers, 0.32 centimeter (⅛ inch) thick and formed with 0.64 centimeter (¼ inch) wide hexagonally shaped low density regions or domes, and having densities in the range of about 90 to 210 grams per square meter have been found to absorb in the range of about 12 to 4 times their weight in grease (with the greater percentage absorption occurring with the less dense pads), which is deemed adequate for use in the package. Other uniform density pads have also been found useful, such as the insulating product which is sold under the trade designation "Thinsulate" by Minnesota Mining and Manufacturing Company, St. Paul, Minnesota in densities of 40, 100 and 200 grams per square meter and absorbs or holds about 15, 16, and 9½ times its own weight of grease respectively; the products sold under the trade designation "Oil Sorbent" and "Insorb Industrial Wipe" by Minnesota Mining and Manufacturing Company, St. Paul, Minnesota which have densities of about 36 and 70 grams per square meter respectively and absorb or hold about 14 and 8 times their own weight in grease respectively. Pads of blown microfibers constructed of a composition comprising a blend containing substantially equal parts by weight of polypropylene and poly 4-methylpentene-1 (PMP), 0.16 cm (0.062 inch) in thickness and thermally embossed on both sides with a 0.40 cm (5/32 inch) hexagonal pattern and having densities in the range of 120-160 grams/sq. meter have been found to absorb in the range of nine and one half (9½) to six (6) times their weight in grease. (Note: The amount of grease absorbed by the above materials was determined by weighing a 4 inch by 6 inch sample of the material, submersing the sample for 15 minutes at room temperature in high density (0.85 s.g.) mineral oil, hanging the sample from a paper clip for 15 minutes to drain away nonretained oil, and weighing the sample with its retained oil.) For the purposes of this invention, the term "grease" includes mineral oil for the purposes of determining the grease absorbing capacity of pad constructed according to this invention.

In selecting the pad material it is preferred to select a pad material that can have about the same surface area as the food which is supported on the pad and can still so completely absorb or otherwise hold all the grease contained in that food, that after the food is cooked and removed from the enclosure, the enclosure will not drip grease even when the opening through which the food was removed is lowermost on the enclosure. For example, such pads that can hold in the range of about 0.1 to 0.15 grams of grease per square centimeter of surface area have been found useful for packaging conventional bacon strips.

The enclosure may be made of one or more conventional polymeric packaging materials such as nylon/ionomer composites of the type available from Curwood, Inc., New London, Wisconsin; or a polyester/polyethylene laminate such as is sold under the trade designation "Scotchpak" by Minnesota Mining and Manufacturing Company, St. Paul, Minnesota. Also the enclosure could be made of a grease resistant paperboard, and the bottom wall of the enclosure could be made of a metal foil.

While the package according to the present invention could be vented by puncturing, as with a fork, to allow the escape of steam and other vapors during cooking, preferably the package includes means that will automatically vent the package during cooking. That means for venting the enclosure could comprise pre-formed openings in the enclosure that are initially closed by a manually removable cover (e.g., a piece of pressure sensitive adhesive coated tape). Preferably, however, that means for venting comprises a deposit of microwave radiation absorbing material adhered to a heat sensitive material forming at least a portion of the enclosure, which microwave radiation absorbing material will be heated by exposure to microwave radiation and will automatically cause a vent to form or open in the heat sensitive material during microwave cooking of the food.

The deposit of microwave radiation absorbing material for 2,450 megahertz radiation normally used in household microwave ovens can comprise nonmetallic, microwave absorbing particles (e.g., graphite, carbon black, iron oxide or ferrite) dispersed in a nonmetallic (e.g., polymeric) binder, which deposit has a thickness within the range from 10 to 300 micrometers, with the particles comprising at least 10% by weight of the deposit as is taught in U.S. Pat. No. 4,640,838, entitled "Self-venting Vapor-tight Microwave Oven Package" issued Feb. 3, 1987 and incorporated herein by reference. Preferably, however, the radiation absorbing material is a metal vapor coating of aluminum with a surface resistance in the range of 50 to 300 ohms per square (about 100 ohms per square preferred) either coated directly on the enclosure or coated on a polymeric film adhered to the enclosure by a suitable adhesive. When the package comprises heat sensitive material such as thermoplastic film and the deposit comprises metal adhered by vapor deposition or radiation absorbing particles adhered by adhesive directly to the film, heating of the deposit by microwaves can soften and weaken that portion of the film to which the deposit is adhered, thus causing that portion to rupture and vent the package under the influence of steam or vapor pressure within the enclosure. When an adhesive layer adheres the deposit to the heat sensitive material which is to be weakened by heat from the particles, that adhesive layer should be thin to afford good heat transfer, preferably from 10 to 20 micrometers.

When the radiation absorbing material is adhered on a polymeric film adhered to the enclosure, rupturing of the softened and weakened portions of the enclosure caused by heating of the deposit by microwaves can occur under the influence of steam or vapor pressure within the enclosure, or because one or both of the films shrink when they are heated causing tearing of the films under the deposit, or because of both causes.

When the deposit itself or a polymeric film to which it is adhered and the adhesive by which the film is adhered to an enclosure are impervious to vapors, but that deposit or adhesive will soften and weaken when heated; the deposit or film can be positioned over a weakness in the package such as an opening, a slit, or a score. When so used, such a deposit may be covered with a vapor-impervious thermoplastic film. Upon doing so, heating of the deposit may either soften and weaken the covering thermoplastic film or film on which the deposit is coated, or venting may occur laterally through the deposit or through an unfilled adhesive layer by which the film and deposit are adhered over a weakness of the package.

The deposit itself or a polymeric film to which the deposit is adhered can also be adhered along a seal between layers of material forming the enclosure that is heat softenable so that heating of the layer during cooking of food within the package by microwave energy will cause the seal to rupture because of vapor pressure in the enclosure.

The deposit can form an alpha numeric message or a distinctive pattern that informs the user of the self-venting nature of the package. Whether directly placed on the enclosure or cut from a pre-formed sheet that is adhered to the enclosure, the deposit may be shaped to concentrate the microwave energy. Preferably the deposit has a distinctive shape to remind the user by its very appearance that the package is self venting and to position the package in the oven so that nothing spills when the vent forms. For such reasons, the deposit preferably is highly conspicuous. The deposit may have the shape of a logo or trademark to identify the company marketing the package.

Additionally while the package may require opening by cutting away one of its edges after the food is cooked, preferably the package further includes means for affording easy manual opening of the enclosure to afford removal of the food without the use of a knife or scissors. In one embodiment, this means is provided by the enclosure comprising face to face layers of the polymeric film having aligned edges defining one edge of the package, and a vapor tight seal between the layers having a portion at a position spaced from that edge of the package which is adapted to be peeled open by manually pulling apart the layers adjacent that edge. In another embodiment this means is provided by the enclosure having a first side edge defined by the polymeric film, the means for venting comprising an elongate layer of the microwave radiation absorbable material adhered to the polymeric film generally parallel to and closely spaced from the first side edge, and the polymeric film including a projecting flap generally parallel to and spaced from the side of the elongate layer opposite the side edge. The flap and first edge are adapted to be manually peeled apart to separate the package along the radiation absorbable material after the film has been weakened and perforated by heating of that material during exposure of the package to microwave energy, and to then peel the layers of film apart by tearing the film on which the flap is formed along its opposite edges. In both embodiments the enclosure can be opened without substantially compressing it which restricts forcing steam or other hot vapors from within the enclosure that could otherwise burn the person opening the package. Alternatively the package may incorporate an easy open tab of the type described in U.S. Pat. No. 4,664,263 issued May 12, 1987, entitled "Divisible Tape Tab For Opening A Container" which permits manual opening of the package by use of the tab.

The package is particularly useful for cooking bacon which when uncooked typically contains in the range of 24 to 33 percent water and 37 to 60 percent fat with the rest being solids. The package will also be useful for other precooked or cured foods with substantial water and fat contents, however, such as sausage, ham, or bologna.

The food may be placed in the package by a producer or meat packer, whereupon the enclosure may be evacuated of air and the package frozen or maintained at low temperatures until it is used by simply placing it in a microwave oven. Since the pad is generally hydrophobic, it will not be affected by moisture in the package during storage. Alternatively, if desired, a food or substance may be placed in the package by a consumer just prior to placing it in a microwave oven. In addition, the generally hydrophobic grease absorbing pad may, if desired, be used in other packages other than the package herein described and may even be used without a package so as to support a food as herein described within a microwave oven without an enclosure.

BRIEF DESCRIPTION OF THE DRAWING

The present invention will be further described with reference to the accompanying drawing wherein like numbers refer to like parts in the several views, and wherein:

FIGS. 10 through 16 are copies of the drawing from U.S. Pat. No. 4,664,263 entitled "Divisible Tape Tab For Opening A Container" referred to in this application, except that the figure numbers have each been increased by 9 and the reference numerals have each been increased by 100, and wherein:

FIG. 10 is a perspective view of a convenience food package having at least a portion thereof formed of flexible material provided thereon with an easy open tab according to the invention described in said U.S. Pat. No. 4,664,263;

FIG. 11 is a perspective view of a convenience food package having an easy open tab constructed according to the invention described in said U.S. Pat. No. 4,664,263 showing the package opened;

FIG. 12 is a detailed perspective view of an easy open tab constructed according to the invention described in said U.S. Pat. No. 4,664,263.

FIG. 13 is a detailed perspective view of another embodiment of the invention described in said U.S. Pat. No. 4,664,263;

FIG. 14 is a detailed perspective view of another embodiment of the invention described in said U.S. Pat. No. 4,664,263;

FIG. 15 is a detailed perspective view of a further embodiment of the invention described in said U.S. Pat. No. 4,664,263; and FIG. 16 is a detailed perspective view of a further embodiment of the invention described in said U.S. Pat. No. 4,664,263.

DETAILED DESCRIPTION

Figure 1:
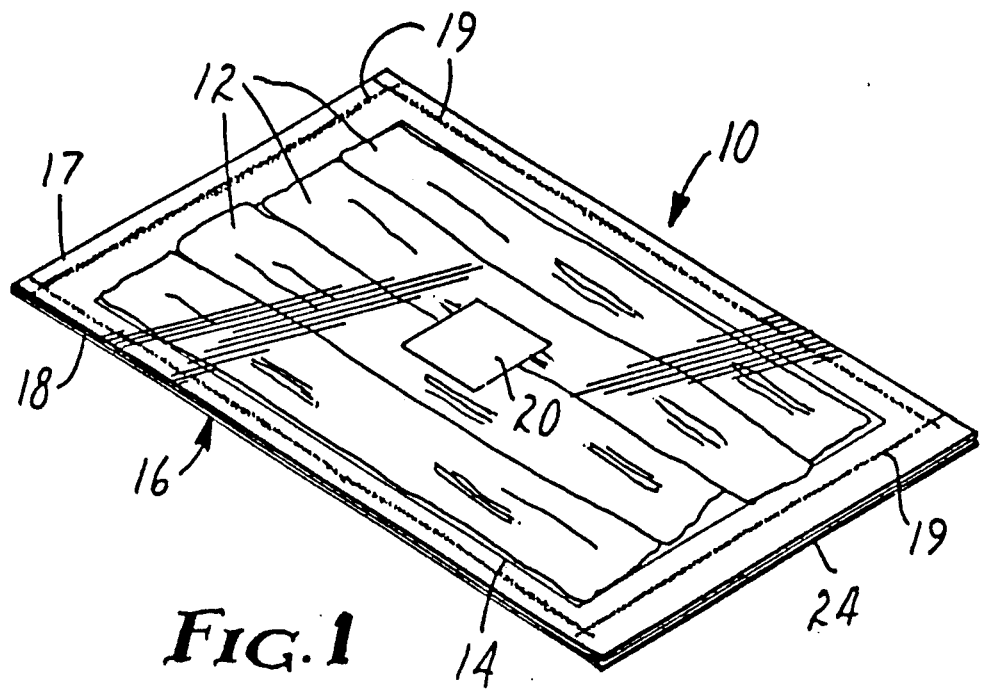
FIG. 1 is a perspective view of a first embodiment of a package according to the present invention.

Referring now to FIGS. 1 through 4 there is shown a first embodiment of a package of food according to the present invention that can be cooked in a microwave oven, which package is generally designated by the reference numeral 10.

Figure 2:
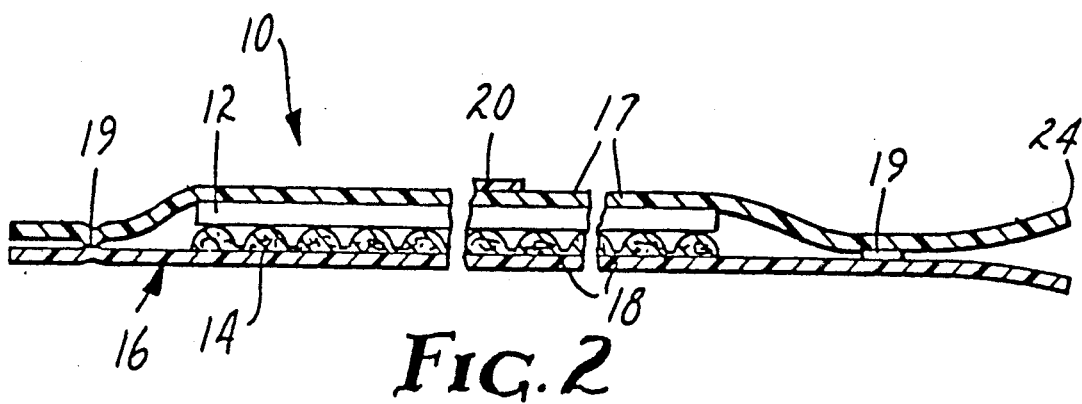
FIG. 2 is an enlarged fragmentary sectional view of the package shown in FIG. 1.

As is best seen in FIGS. 1 and 2, the package 10 includes food (e.g. bacon) 12 containing a substantial amount of solidified grease and water, and a pad 14 adjacent the food substance comprising microwave radiation transparent generally hydrophobic grease absorbing materials capable of at least absorbing the amount of grease in the food when that grease is liquefied.

Preferably the pad comprises melt blown microfibers made in accordance with the teachings in U.S. Pat. Nos. 4,103,058 and 4,042,740 (incorporated herein by reference) so that the pad has a network of compacted high density regions and pillowed low density regions that form a field of generally dome-like members on the apexes of which the food is supported. The blown microfibers may be of polypropylene, however, blown microfibers of polyester, polymethylpentene or polyethylene, or blends of any of the preceding materials may also be useful. Most preferably, the pad is produced from blown microfibers constructed of a composition comprising a blend containing substantially equal parts by weight of polypropylene and poly 4-methylpentene-1 (referred to generally as PMP) (marketed under the brand name TPX by Mitsui Petrochemicals (America), Ltd. of New York, New York). Other materials may be included in the composition of the microfibers as long as the other materials do not adversely affect the generally hydrophobic, grease absorbing properties of the microfibers. For the purposes of this invention, the term "blend" includes a mixture of two or more constituents before or at the time of the formation of the microfibers and specifically includes polymeric alloys and biconstituent mixtures, as well as bicomponent microfibers.

Pads of polypropylene blown microfibers, 0.32 centimeter ($\frac{1}{8}$ inch) thick and formed with 0.64 centimeter ($\frac{1}{4}$ inch) wide hexagonally shaped low density regions or domes, and having densities in the range of about 90 to 210 grams per square meter have been found to absorb in the range of about 12 to 4 times their weight in grease (with the greater percentage adsorption occurring with the less dense pads), which is deemed adequate for use in the package. Other uniform density pads have also been found useful, such as the insulating product which is sold under the trade designation "Thinsulate" by Minnesota Mining and Manufacturing Company, St. Paul, Minnesota in densities of 40, 100 and 200 grams per square meter and absorbs or holds about 15, 16, and 9$\frac{1}{2}$ times its own weight of grease respectively; the products sold under the trade designation "Oil Sorbent" and "Insorb Industrial Wipe" by Minnesota Mining and Manufacturing Company, St. Paul, Minnesota which have densities of about 36 and 70 grams per square meter respectively and absorb or hold about 14 and 8 times their own weight in grease respectively. Pads produced from blown microfibers constructed of a composition comprising a blend containing substantially equal parts by weight of polypropylene and poly 4-methylpentene-1 (PMP), 0.16 centimeter (0.062 inch) in thickness and thermally embossed on both sides with a 0.40 centimeter (5/32 inch) hexagonal pattern and having densities in the range of 120-160 grams/sq. meter have been found to absorb in the range of nine and one half (9$\frac{1}{2}$) to six (6) times their weight in grease. (Note: The amount of grease absorbed by the above materials was determined by weighing a 10.2 centimeter (4 inch) by 15.2 centimeter (6 inch) sample of the material, submersing the sample for 15 minutes at room temperature in high density (0.85 s.g.) mineral oil, hanging the sample from a paper clip for 15 minutes to drain away nonretained oil, and weighing the sample with its retained oil.)

A pad composition comprising a blend containing substantially equal parts by weight of polypropylene and poly 4-methylpentene-1 (PMP) remains generally hydrophobic even for extended periods of time. By way of example, a 10.2 centimeter (4 inch) by 15.2 centimeter (6 inch) pad was constructed according to the invention from a 50%/50% blend by weight of PMP (marketed under the brand name MX-007 TPX by Mitsui Petrochemicals (America), Ltd.) and polypropylene (marketed under the brand name Escorene PP 3085 by Exxon Chemical Co. of Darien, Ct.) having a basis weight of 152 grams/sq. meter. The pad was placed on a 0.64 centimeter (0.25 inch) open mesh screen above 2 liters of water in a 18.9 liter (5 gallon) pail. The pail was sealed and remained for 24 hours at 25° C. (77° F). After 24 hours, the pail was opened and the pad removed and immediately weighed. The pad had a weight gain of less than 4%. An identical pad was immersed in room temperature tap water for 3 hours. It was then removed and weighed. The weight gain of the pad was 63%, as opposed to the 600% to 950% grease absorbing capacity of the pad, as previously discussed.

The hydrophobic properties of this pad is important not only so that moisture is not absorbed from the food during storage and transportation, but also during cooking. The capacity of the pad to absorb grease from the food is not inhibited by the water produced from the food during cooking. Therefore the size and weight of the pad is minimized relative to the weight and size of the food and package.

A pad produced from microfibers constructed of a composition comprising a blend containing substantially equal parts by weight of polypropylene and poly 4-methylpentene-1 (PMP) also exhibits superior grease absorbing characteristics. Preferably, the microfibers formed are no greater than 30 microns in diameter, and most preferably, the microfibers are less than 10 microns in diameter. Although the mechanism for absorbing grease is not entirely understood, it is believed that grease absorbed into a pad coats the surface of the microfibers and occupies voids between the microfibers through capillary forces. Therefore, the smaller the average diameters of the microfibers, the greater the available surface area for a given weight of microfibers and the greater the void space that can be constructed between the microfibers for receipt of the grease. It is also believed that a small quantity (less than 10%) of the grease may be absorbed into the material of the microfibers themselves. For a pad produced from microfibers constructed of a composition comprising a blend containing substantially equal parts by weight of polypropylene and poly 4-methylpentene-1 (PMP) approximately 87% of the pad volume was void space and only 13% of the pad volume was occupied by the microfibers.

The grease absorbing capacity of a pad has been found to be increased by constructing a composite pad from multiple pads that are bonded or fused together, as compared to the same quantity of material used to form a single pad. For example, a pair of pads were produced from microfibers constructed of a composition comprising a blend containing substantially equal parts by weight of polypropylene and poly 4-methylpentene-1 (PMP) as previously described. The pads were substantially identical except that one pad included a single layer of microfibers having a weight of 150 grams/sq. meter and the composite pad included two separate pads each having a weight of 75 grams/sq. meter, with the separate pads bonded to each other along the edges of opposing major surfaces to form the composite pad. 10.2 centimeter (4 inch) by 15.2 centimeter (6 inch) sections of the single and composite pads were tested for grease absorbency as herein described, except that the drip time was extended from 15 minutes to 25 minutes. The single pad of 150 grams/sq. meter was found to have to have absorbed 13.5 grams of oil, whereas the composite pad absorbed 19.0 grams of oil, an increase of 40.7% for the same quantity of microfibers. Of course, a composite pad may be constructed having more than two pads bonded together, if desired. Another advantage of the composite pad construction is that only the pad adjacent the food is required to be produced from microfibers constructed of a composition comprising a blend containing substantially equal parts by weight of polypropylene and poly 4-methylpentene-1 (PMP) for the advantages herein discussed. One or more of the pads spaced from the food may be constructed according to any of the materials or blends enumerated in co-pending U.S. patent application No. 780,219 entitled "Microwave Food Package". These remote pads are protected from direct contact with the food.

A pad produced from microfibers constructed of a composition comprising a blend containing substantially equal parts by weight of polypropylene and poly 4-methylpentene-1 (PMP) exhibits unexpected properties when used as a generally hydrophobic grease absorbent pad in a microwave food package with cured or precooked foods (i.e. bacon, sausage, ham or bologna) containing substantial amounts of water and solidified grease. It is known that polypropylene microfibers have a melting temperature of approximately 150° C. as measured on a differential scanning calorimetry (DSC) trace with a heating rate of 10° C./ minute and that PMP microfibers have a melting temperature of approximately 230° C. on a differential scanning calorimetry (DSC) trace with a heating rate of 10° C./ minute. A microfiber constructed of a composition comprising a blend containing substantially equal parts by weight of polypropylene and poly 4-methylpentene-1 (PMP) shows a differential scanning calorimetry (DSC) trace with a heating rate of 10° C./minute with two distinct melting temperatures corresponding to the individual melting temperatures of polypropylene and PMP. Polypropylene may be used in a microwave oven when cooking temperatures are relatively low. However, as the cooking temperatures in a microwave oven approach the measured melting temperature of polypropylene, the polypropylene will gradually be physically degraded. Foods containing substantial amounts of water and solidified grease and particularly those previously identified as precooked or cured, usually require cooking at elevated temperatures (i.e. approximately 150° C. and above). It would be expected therefore, that a pad produced from microfibers constructed of a composition comprising a blend containing substantially equal parts by weight of polypropylene and poly 4-methylpentene-1 (PMP) and subjected to such elevated temperatures would result in substantial physical degradation of the pad. In fact, the pad does not physically degrade, even at temperatures high above the normal melting temperature of polypropylene.

A pad constructed of PMP microfibers alone also exhibits an undesirable characteristic in that at cooking temperatures within a microwave oven, the microfibers have a tendency to stick to food. However, when blended in substantially equal quantities by weight with polypropylene, the microfibers in a pad according to this invention do not adhere to food during cooking conditions at elevated temperatures. Thus a pad produced from microfibers constructed of a composition comprising a blend containing substantially equal parts by weight of polypropylene and poly 4-methylpentene-1 (PMP) exhibits properties at elevated temperatures intermediate the properties of either material alone at the same temperature, notwithstanding the measured DSC characteristics of the blend. The performance of the pad produced from microfibers constructed of a composition comprising a blend containing substantially equal parts by weight of polypropylene and poly 4-methylpentene-1 (PMP) enables the pad to be placed directly adjacent the food during cooking. This eliminates the need for an intervening perforated or porous protective layer in the package between the absorbent pad and the food, thereby reducing the complexity, weight and expense of the package. In addition, the process of absorbing the grease from the food is facilitated by the placement of the pad adjacent the food.

Since the pad is to be placed adjacent the food within the package and thus in direct contact with the food, it is important that individual microfibers in the pad are prevented from being dislodged from the pad and adhered to the food. This is particularly of concern for smaller microfibers (1–5 microns in diameter) adjacent the surface of the pad in contact with the food. Therefore, in the preferred embodiment of the invention, at least one surface of the pad is treated, such as by thermally embossing, so as to fuse the microfibers adjacent the surface of the pad more securely to each other and thereby reduce or eliminate the sloughing of microfibers to food. Preferably, the microfibers are thermally embossed on both sides of a pad, such as in a repeating pattern of 0.40 centimeter (5/32 inch) hexagonal areas.

Although the pad has been shown and described in regard to placement in and use with a specific package construction in a microwave oven, it is to be understood that the pad herein described is equally applicable for use in any situation requiring a generally hydrophobic grease absorbing material placed adjacent food containing substantial quantities of water and grease, and in particular those foods that are precooked or cured so as to require elevated cooking temperatures. For instance, the pad produced from microfibers constructed of a composition comprising a blend containing substantially equal parts by weight of polypropylene and poly 4-methylpentene-1 (PMP) may be utilized with any package other than the package herein described, whether placed adjacent the food or separated from the food by a porous or foraminous film. Further, the pad of this invention may be used without a package by placing the food directly on a pad within a microwave oven, if desired. The size of the pad is not limited by the size of the food to be cooked. Further, it is within the scope of this invention to construct a continuous web containing a plurality of such pads, with each pad separable from the web, such as along perforated lines, for use with food as herein described.

In selecting the pad material it is preferred to select a pad material that can have about the same surface area as the food which is supported on the pad and can still so completely absorb or otherwise hold all the grease contained in that food, that after the food is cooked and removed from the enclosure, the enclosure will not drip grease even when the opening through which the food was removed is lowermost on the enclosure. For example, such pads that can hold in the range of about 0.1 to 0.15 grams of grease per square centimeter of surface area have been found useful for packaging conventional bacon strips.

A generally rectangular vapor tight microwave radiation transparent enclosure 16 surrounds the pad 14 and food 12 and comprises top and bottom rectangular sheets 17 and 18 of polymeric film fastened together as by heat sealing to provide a vapor tight seal 19 around their peripheries with the pad 14 and food 12 therebetween.

Figure 3:
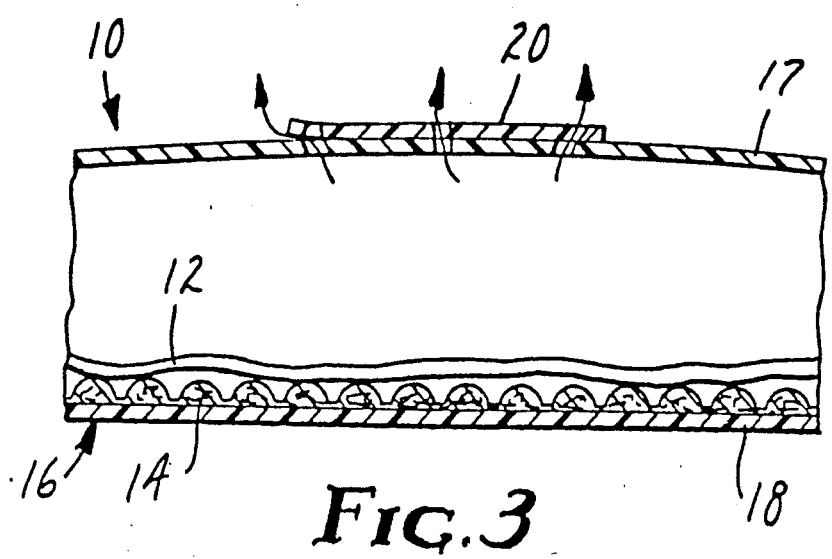
FIG. 3 is an enlarged fragmentary view of the package of FIG. 1 while a food within the package is being cooked in a microwave oven.

Means are provided for venting the enclosure 16 to afford cooking the food 12 within the enclosure 16 in a microwave oven, which means for venting comprises a layer of microwave radiation absorbable material in the form of a rectangular piece of metal vapor coated film 20 adhered by a suitable adhesive to the top sheet 17 of the polymeric film forming the enclosure 16. The vapor coated film 20 and top sheet 17 of polymeric film forming the enclosure 16 will be softened by heating of the metal vapor coating to cause rupturing of that top sheet 17 of film and vapor coated film 20 due to steam or vapor pressure within the enclosure 16 and/or different amounts of shrinking of the films 17 and 20 during cooking of the food 12 by microwave energy so that, as illustrated in FIG. 3, the top sheet 17 of film and the vapor coated film 20 will allow excess steam or vapor pressure within the enclosure 16 to escape, while retaining sufficient steam or vapor within the enclosure 16 to enhance cooking of the food 12.

Also included in the package 10 are means for affording easy manual opening of the enclosure 16 to facilitate removal of the food 12.

A portion of the seal 19 between the face to face layers of the polymeric film adjacent one edge 24 of the package 10, is spaced a substantial distance (i.e., over 3 centimeters and preferably about 6 centimeters) from that edge 24 and is adapted to be manually peeled apart by manually pulling apart the top and bottom sheet 17 and 18 of film adjacent the edge 24. This opening can occur without compressing the package 10 so that hot vapors will not be forced from within the package 10 through the vents formed at the vapor coated film 20 as a person opens the package 10.

As a nonlimiting example of the package 10 illustrated in FIGS. 1 through 4, polypropylene microfibers were collected on a 0.64 centimeter (¼ inch) hexagonal patterned mesh screened drum in accordance with the teachings of U.S. Patents Nos. 4,103,058 and 4,042,740 to provide 105 grams of microfibers per square meter, and a six (6) inch by ten (10) inch pad was cut from these microfibers. Food 12 in the form of four slices of bacon each weighing about 0.8 ounces were placed on the pillowed surface of the pad 14. The enclosure 16 was formed from top and bottom rectangular sheets 17 and 18 of the material sold under the trade designation "Scotchpak" by Minnesota Mining and Manufacturing Company, St. Paul, Minnesota, each of which sheets 17 and 18 was 30.5 centimeters (12 inches) long by 25.4 centimeters (10 inch) wide and 0.005 centimeter (0.002 inch) thick. The top and bottom sheets 17 and 18 were heat sealed together around their peripheries, and a 2.5 centimeter (1 inch) by 5 centimeters (2 inch) piece of film vapor coated with aluminum having a surface resistivity of 100 ohms per square was adhered by a suitable adhesive to the center of the top sheet 17. The resultant package 10 was placed in a 630 watt microwave (i.e., 2,450 megahertz radiation) oven that was activated for 2½ minutes at full power. The melted grease from the bacon was completely contained in the pad 14 and did not drip from the pad 14 after the enclosure was opened, and no significant distortion of the pad 14 was seen even though the temperature of the grease reaching the pad was about 123° C. (253° F.). The grease was rapidly wicked away from the cooking bacon which seemed to prevent excessive heat buildup in the grease. The piece of metal vapor coated film 20 was heated by the microwave radiation and heated and softened the top sheet 17 of film during the cooking process, causing both films 17 and 20 to rupture and vent the enclosure 16 due either to the steam or vapor pressure within the enclosure 16 or because of different rates of shrinkage between the oriented top sheet 17 and the oriented vapor coated film 20, or a combination of both effects. The ruptured films 17 and 20 still restricted release of the steam or vapor within the enclosure 16, however, so that only enough of the steam or vapor was released to prevent the enclosure 16 from exploding, and sufficient hot steam or vapor was retained in the enclosure 16 to fully inflate it and surround the bacon within it to aid in the cooking process and provide what appeared to be a more uniformly cooked bacon in less time and with less grease adhered to it than when similar bacon was prepared in the same oven without the package 10. Similar results were obtained on a package 10 made and tested in the manner described above in which a nylon/ionomer composite obtained from Curwood, Inc., New London, Wisconsin was used as the material for the top and bottom sheets 17 and 18 of the enclosure 16.

Referring now to FIGS. 5 through 8 there is shown a second embodiment of a package of food according to the present invention that can be cooked in a microwave oven, which package is generally designated by the reference numeral 30.

Figure 5:
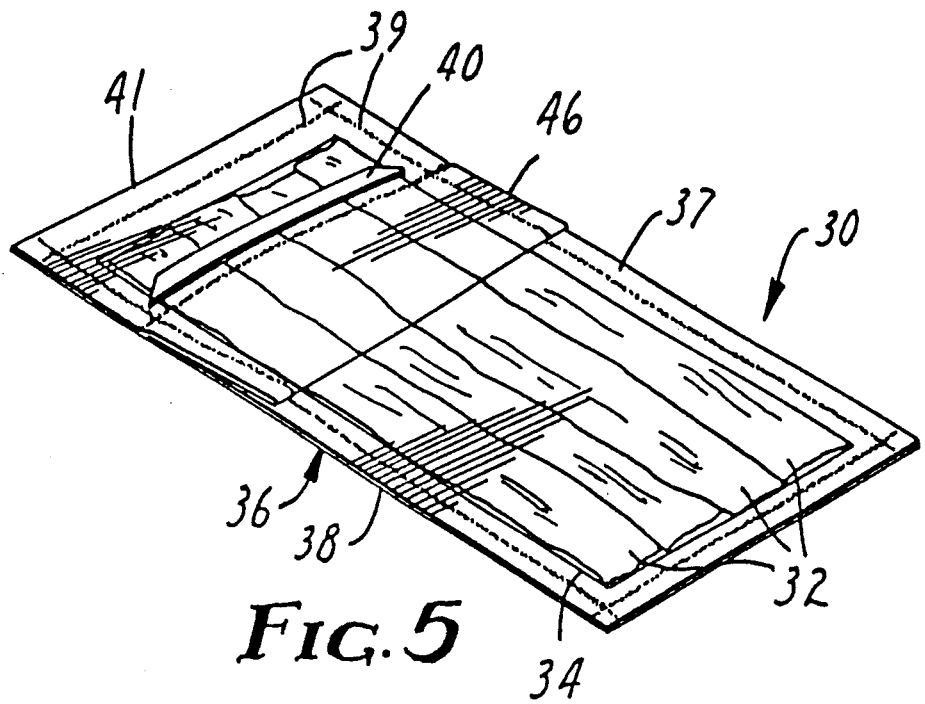
FIG. 5 is a perspective view of a second embodiment of a package according to the present invention.
Figure 6:
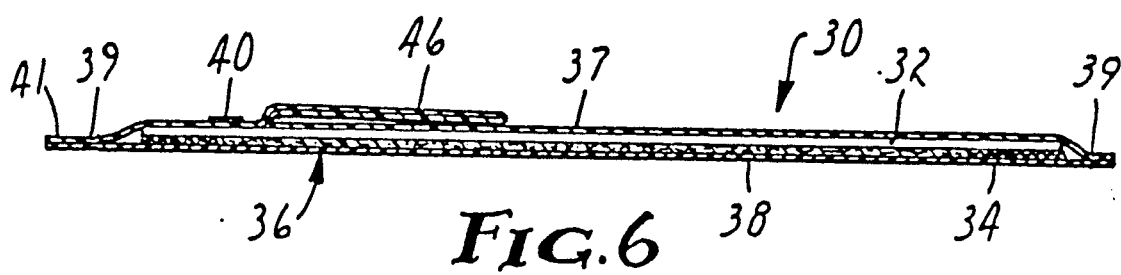
FIG. 6 is a sectional view of the package shown in FIG. 5.

As is best seen in FIGS. 5 and 6, the package 30 comprises food (e.g. bacon) 32 containing a substantial amount of solidified grease and water, and a pad 34 adjacent the food substance comprising microwave radiation transparent generally hydrophobic grease absorbing materials capable of at least holding the amount of grease in the food when that grease is liquefied. A generally rectangular vapor tight microwave radiation transparent enclosure 36 surrounds the pad 34 and food 32 and comprises top and bottom rectangular sheets 37 and 38 of polymeric film fastened together as by heat sealing to provide a vapor tight seal 39 around their peripheries with the pad 34 and food 32 therebetween.

Figure 7:
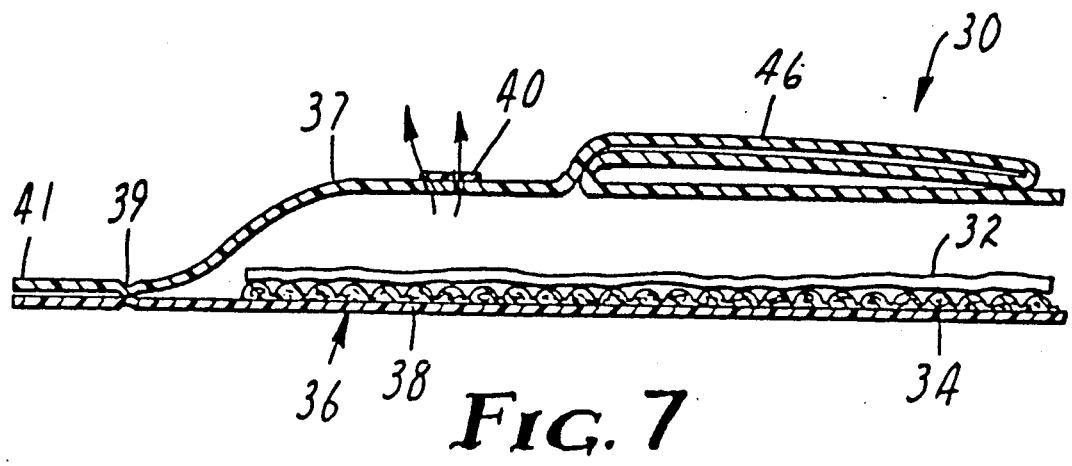
FIG. 7 is an enlarged fragmentary sectional view of the package of FIG. 5 while a food within the package is being cooked in a microwave oven.
Figure 4:
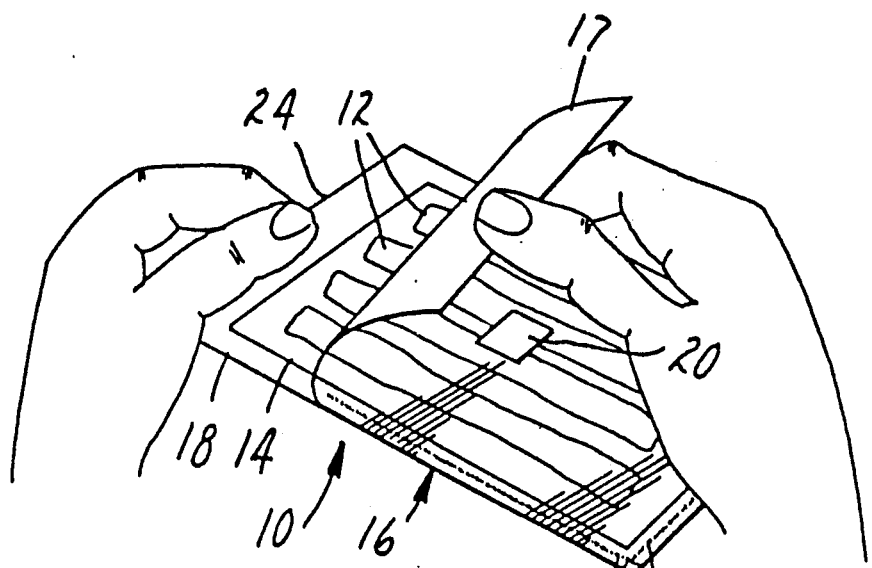
FIG. 4 is a perspective view of the package of FIG. 1 being opened.
Figure 8:
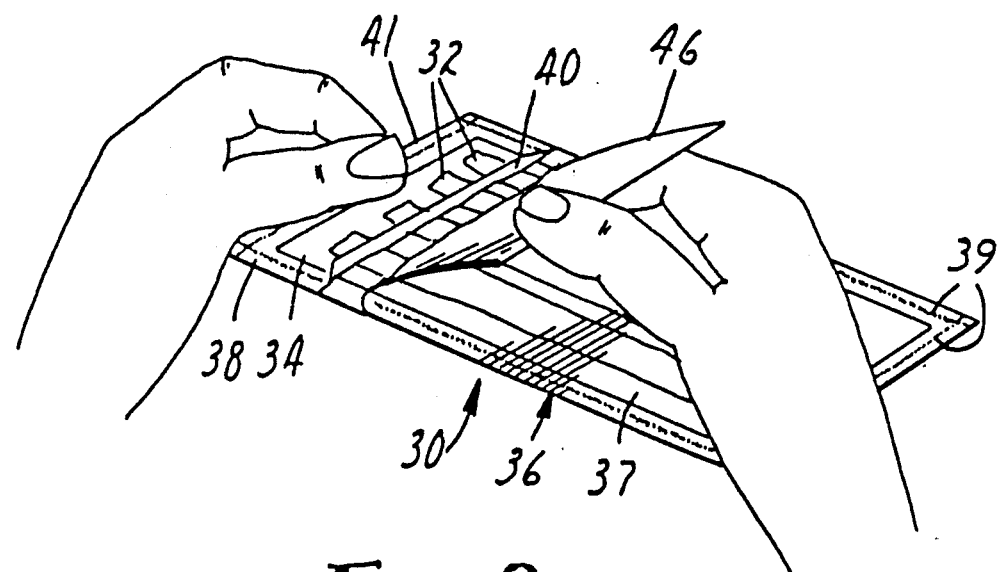
FIG. 8 is a perspective view of the package of FIG. 5 being opened.

Means are provided for venting the enclosure 36 to afford cooking the food 32 within the enclosure 36 in a microwave oven which means for venting comprises a layer of microwave radiation absorbable material in the form of an elongate length of metal vapor coated film 40 adhered by a suitable adhesive transversely across one end of the top sheet 37 of polymeric film forming the enclosure 36 adjacent one side edge 41 of the enclosure 36. The vapor coated film 40 and top sheet 37 of polymeric film forming the enclosure 36 will be softened by heating of the metal vapor coating to cause rupturing of that top sheet 37 of film and vapor coated film 40 due to steam or vapor pressure within the enclosure 36 and/or different amounts of shrinkage of the films 37 and 40 during cooking of the food 32 by microwave energy so that, as illustrated in FIG. 7, the top sheet 37 of film, fastened to bottom sheet 38 of film by a vapor tight seal 39, and the vapor coated film 40 will allow excess steam or vapor pressure within the enclosure 36 to escape, while retaining sufficient steam or vapor within the enclosure 36 to enhance cooking of the food 32 adjacent pad 34.

Also included in the package 30 are means for affording easy manual opening of the enclosure 36 to facilitate removal of the food 32.

The top sheet 37 of polymeric film is folded on itself to provide a projecting flap 46 (also shown in FIGS. 4 and 5) generally parallel to and spaced from the side of the elongate length of metal vapor coated film 40 opposite the side edge 41. The flap 46 and side edge 41 are adapted to be manually pulled apart (see FIG. 8) to separate the top sheet 37 of the enclosure 36 along the length of metal vapor coated film 40 and tear it along its edges after that film 40 has weakened and perforated that top sheet 37 by heating it during exposure of the package 30 to microwave energy.

Figure 9:
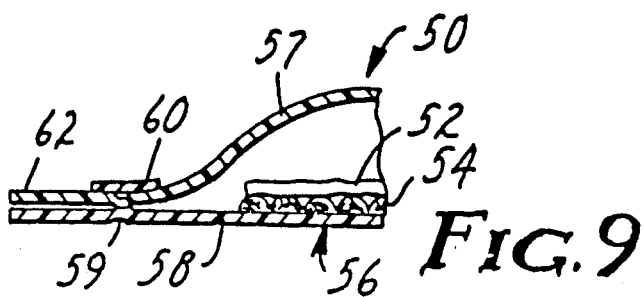
FIG. 9 is a fragmentary sectional view of a third embodiment of a package according to the present invention.

Referring now to FIG. 9 there is shown a third embodiment of a package of food according to the present invention that can be cooked in a microwave oven, which package is generally designated by the reference numeral 50.

The package 50 comprises food (e.g. bacon) 52 containing a substantial amount of solidified grease and water, and a pad 54 adjacent the food substance comprising microwave radiation transparent generally hydrophobic grease absorbing materials capable of at least holding the amount of grease in the food when that grease is liquefied. A generally rectangular vapor tight microwave radiation transparent enclosure 56 surrounds the pad 54 and food 52 and comprises top and bottom rectangular sheets 57 and 58 of polymeric film fastened together as by heat sealing to provide a vapor tight seal 59 around their peripheries with the pad 54 and food 52 therebetween.

Means are provided for venting the enclosure 56 to afford cooking the food 52 within the enclosure 56 in a microwave oven which means for venting comprises a layer of microwave radiation absorbable material in the form of an elongate length of metal vapor coated film 60 adhered by a suitable adhesive along the seal 59 across one end 62 of the enclosure 56. The vapor coated film 60, sheets 57 and 58 of polymeric film and seal 59 will be softened by heating of the metal vapor coating to cause rupturing of the seal 59 due to steam or vapor pressure within the enclosure 56 so that excess steam or vapor pressure within the enclosure 36 will escape through the weakened seal 59, while retaining sufficient steam or vapor within the enclosure 56 to enhance cooking of the food 52.

The sheets 57 and 58 can then be separated along the weakened seal 59 which provides means for affording easy manual opening of the enclosure 56 to facilitate removal of the food 52.

U.S. Pat. No. 4,664,263 describes an easy open tab illustrated in FIGS. 10 through 16 that may be used on a package of food according to the present invention as a substitute for the other means for affording easy opening of the enclosures 16, 36 or 56. The following description, except for the last paragraph, has been copied from U.S. Pat. No. 4,664,263 except that the Figure numbers have been increased by 9 and the reference numerals have been increased by 100.

The present invention relates to a new easy open package for permitting easy access to the contents of the package when the package is formed with at least a portion of flexible tearable material. The thin flexible material preferably is adapted to tear upon opposed or oppositely directed forces being exerted to the material and/or to opposite sides of a cut or opening formed in the material to propagate a tear. To this portion of the package is adhered a length of tape having a discontinuity permitting a tearing of the tape between its edges and a tearing of the material beneath the tape.

The length of tape is adhered to the material and covers the cut or opening. The cut or opening in the material may be in the form of a slit, a hole, or a series of perforations. A slit may be formed with diverging slits at one end. The tape comprises a backing having a coating of adhesive material on one surface of the backing which adhesive adheres the backing to the flexible material surrounding the opening. The tape is formed with a tab at a position spaced from the opening in the package. The tab may be formed by folding the tape upon itself, by applying a piece of material over an exposed portion of the tape to detacify the adhesive or by placing a second piece of tape with one portion thereof in contact with the adhesive coating on the first piece of tape. The tab is formed along its free edge with a discontinuity in the form of a slit or notch in the free end of the tab tape between the edges of the tape. The discontinuity in the tab is directed toward the portion of the tape adhered to the material over the opening. The tab and its discontinuity thus forms means by which a tear may be initiated in the tape to tear the tab and the tape adhered to the material causing a tearing of the material beneath the tear in the tape which will be then propagated through the material to afford an opening large enough to permit access to the contents of the package.

Means may be provided to initially adhere the tab in the plane of the remainder of the tape to negate the possibility of premature tearing of the tape during packaging and handling operations.

Figure 10:
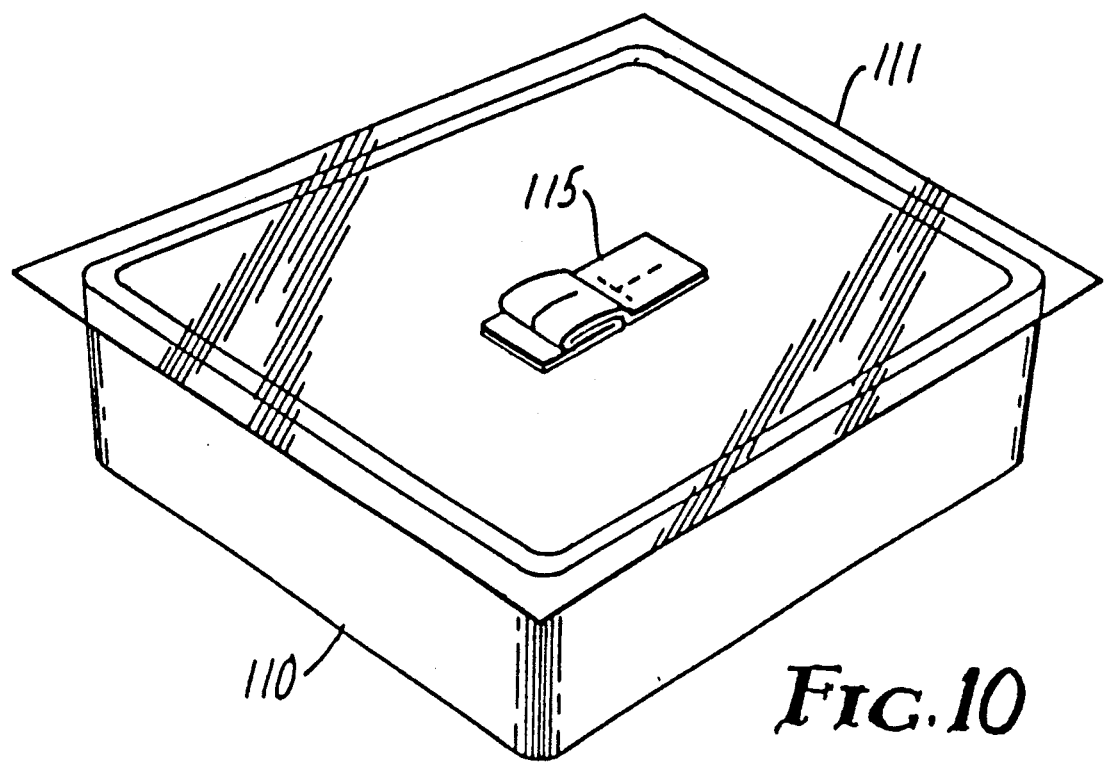

Referring to FIG. 10 there is illustrated a convenience food package which comprises a tray 110 formed with a flexible cover 111 which is formed of a flexible material to protect the contents of the package. Examples of the flexible material will be defined hereinafter. This flexible material portion 111 of the package is formed with an easy open tab 115 constructed according to the present invention.

Figure 11:
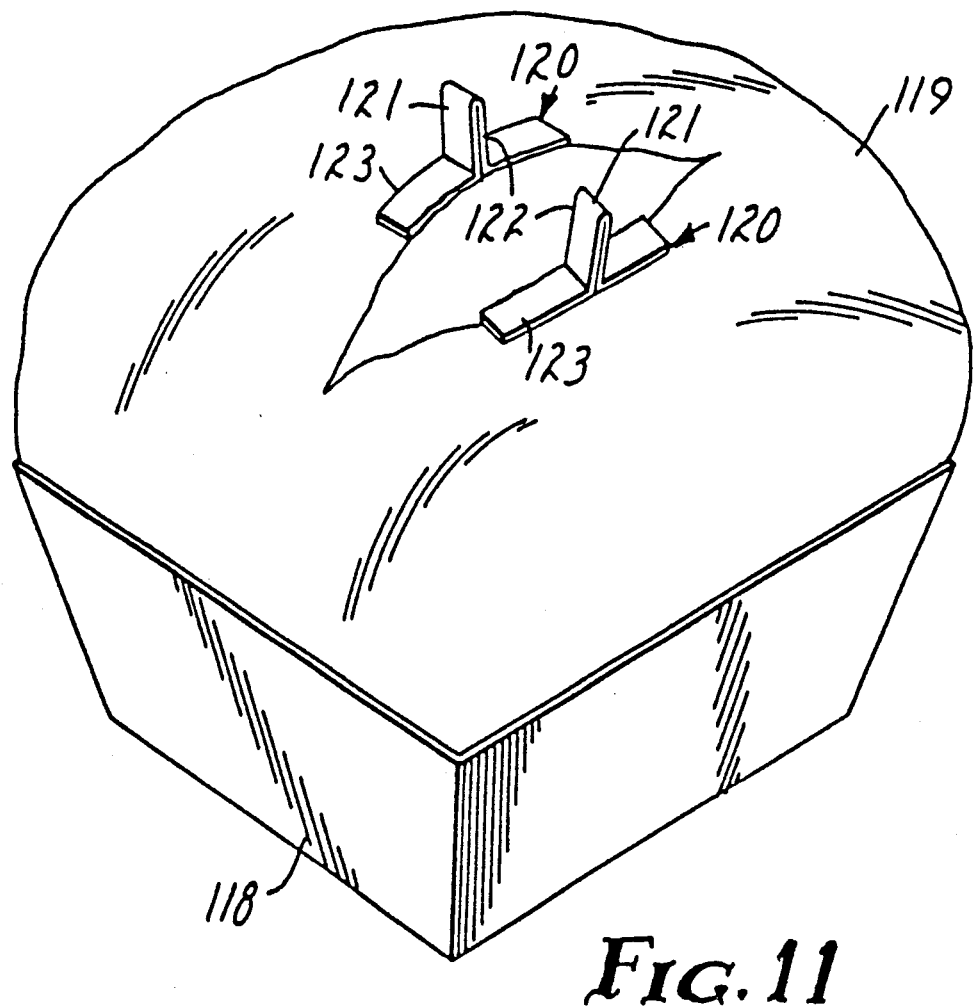

FIG. 11 shows a further embodiment of a convenience food package which may be adapted for microwave cooking comprising a tray 118 which supports a bag 119 formed of a flexible polymeric material such as the bags formed for containing microwavable popcorn. The flexible bag 119 of the illustrated package is formed with an easy open tab 120 constructed according to the present invention. As illustrated the tape tab 121 has been separated at a pre-formed slit 122 and the tape 123 has torn longitudinally.

Figure 12:
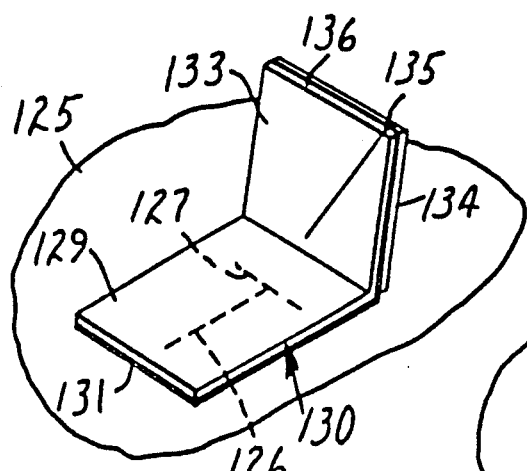

Referring now to FIG. 12 there is illustrated a detailed perspective view of an easy open tape tab structure according to the present invention. FIG. 12 shows a portion of flexible material 125 of a container. This portion of material 125 is formed with a slit 126 extending therethrough. The slit 126 communicates with a transverse slit 127 which thus forms a T-shaped slit. Positioned over this slit is a length of tape 130. The tape comprises a backing 129 having on one surface a layer of adhesive 131 which adheres the tape backing to the flexible portion 125 over the slit 126, 127. One portion of the tape is formed to define a tab 133 which is formed to be loose or free of the portion 125. This is accomplished by folding the tape 130 upon itself such that the tab 133 is formed by positioning adhesive against adhesive. The tab 133 may alternatively be formed, as illustrated, by positioning a piece of material 134 such as paper, another film, or a detacifying substance against the exposed adhesive.

The tab 133 thus formed is provided with a discontinuity 135 along its free edge 136. The discontinuity illustrated in FIG. 12 is a slit in the tab which is directed toward a central portion of the tape adhered to the portion 125 and toward a position generally aligned with the slit 126 in the portion 125.

The portions of the tab 133 defined by the slit 135 may then be grasped one tab portion between the thumb and index finger of each hand and moved apart to open the discontinuity 135 and cause a tearing of the portion 137 of the tape 130 adhered to the package. Tearing the tab 133 toward the opening 126, 127 eventually causes a tearing and separation of the portion 125 at the slit 126 and a migration of the slit 126 through the portion 125. The tearing will also migrate along the slit 127 to cause an enlarged opening to be formed in the portion 125.

Figure 13:
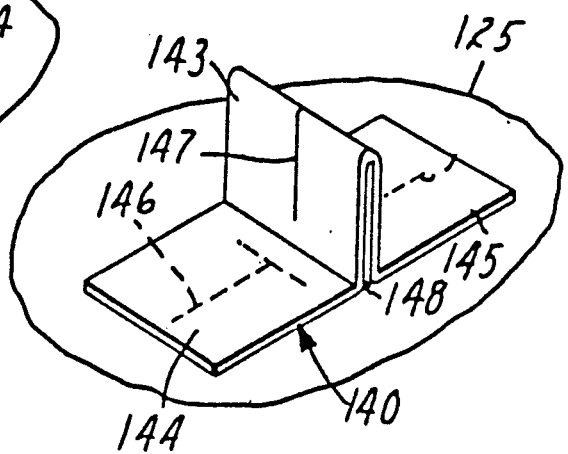

Referring now to FIG. 13 there is illustrated a second embodiment of the present invention wherein the opening tab is formed by a length of tape 140 which is folded upon itself between the ends of the tape to form a tab 143 between two portions or legs 144 and 145, each of which are positioned over opening 146 formed through the flexible material 125 of the package. In this embodiment a slit 147 is formed in the tab 143 and causes a tearing of the tape and an opening of the flexible portion in the same manner as described with respect to FIG. 12. Further, a piece of web material 148 such as paper or other plastic material having printed messages thereon could be positioned between the folded areas of the tape defining the tab 143 to give .the tab greater thickness than the thickness of the tape and to provide a means for inexpensively applying printed indicia to the tab to include such things as opening instructions.

Figure 14:
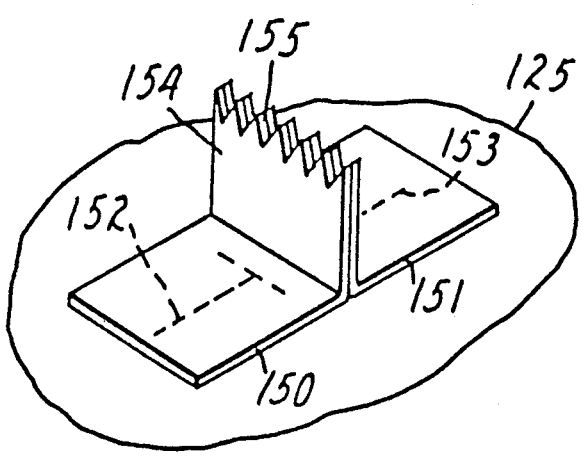

Referring to FIG. 14 there is illustrated a further embodiment wherein the opening tab is formed by two lengths of tape 150 and 151, one of which has a portion applied over a first opening 152 and the second has a portion applied over a second opening 153. The opposite ends of the two tapes are positioned in opposed relationship and are adhered together to define a tab 154. In this embodiment the two tapes are severed at the free end of the tab 154 and the severing of the tape forms a series of notches or slits 155 in the ends of the tapes defining the tab such that a tear may be placed in the tape readily following the notches which would progress through the two lengths of tape 150 and 151 to the openings 152 and 153 in the portion 125, causing the openings in the portion 125 to expand, providing access to the contents of the package.

Figure 15:
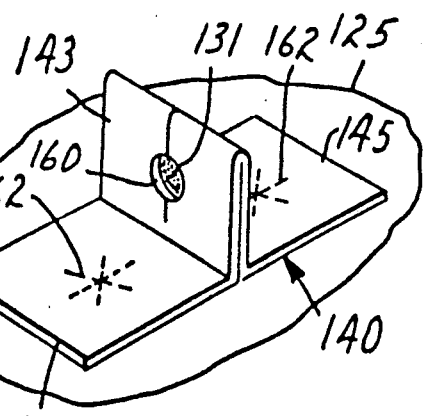

Referring now to FIG. 15 a further embodiment is illustrated wherein the tab 143 is formed generally as described in FIG. 13 between two portions or legs 144 and 145, each of which are positioned over an opening 162 formed through the flexible material 125 of the package, but the tape is folded upon itself, with no strip of material 148 therebetween and an opening 160 is formed in the tape defining the tab 143. The opening 160 is placed in a position to be disposed within the tab 143 which is formed by folding the tapes upon themselves such that through the opening 160 the adhesive surface 131 of the second layer of tape will be exposed through the opening 160. Thus if the tab is folded to the left, as shown in FIG. 15, the adhesive 131 exposed through the opening 160 may contact the top surface of the portion 144 of the tape 140 to hold the tab 143 flat with the plane of the portion 125 of the package such that until use, the tab 143 is tacked down by the adhesive and the tab will not stick up and interfere with further packaging production after the opening tab has been applied to the package. This partial adhesion along the tab permits easy pick up of the tab when opening is desired. FIG. 15 also shows in dotted lines the fact that the opening 162 in the portion 125, which is covered by the tape, may take a configuration different from a T-shaped or Y-shaped slit, a hole or perforated line.

Figure 16:
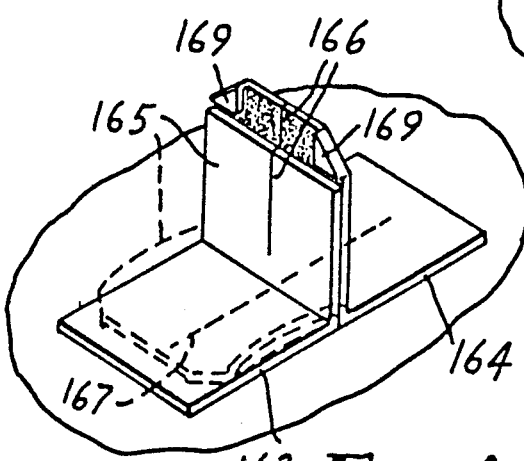

A further example of a tape tab formed to have this hold-down feature is shown in FIG. 16 where the tape tab 165 is formed from two lengths of tape 163 and 164 with the tapes applied to each other. The tape 164 has a portion of its length defining the tab longer than the other tape 163 so that the tape 164 extends beyond the end of the second length of tape 163 such that when it is folded down to the position shown in dotted lines the adhesive surface which is exposed on tape 164 may be positioned to contact the nonadhesive coated surface of the other tape 163 or to contact the portion 125 to maintain the tab flat and in a position so as not to obstruct further packaging operations. Preferably the corners of extended end of tape 164 can be folded as illustrated at 169 to form tabs for facile lifting of the tab 165. This tab 165 is formed with an edge discontinuity 166 corresponding to the cuts or notches of the other embodiments. The opening 167 in the material 125 in this embodiment is illustrated as a continuous slit covered by the portions of tape 163 and 164 adhered to the material.

Materials which are thin flexible packaging materials for articles, foods and sterilization and usable with opening tabs of the present invention include polyvinylidene chloride, cellophane, thin, i.e., 0.013 millimeter (0.0005 inch) aluminum foil, 0.089 millimeter (0.00035 inch) aluminum foil/20 pound paper, biaxially oriented polypropylene film, low density polyethylene, laminates of polyester and polyethylene, polycarbonate films, polyamide films, acetate films. 20 pound kraft paper and biaxially oriented polyethylene terephthalate.

The tape materials for the easy-open tape tabs comprise a backing which will propagate a tear along its length. Such backings may have an embossed line or lines which define lines of tear, longitudinally extending fibers or they may be oriented to tear directionally. The tapes are pressure sensitive adhesive tapes. Examples of backing materials include polyethylene terephthalate, acetate, polypropylene, paper and fiber reinforced backings, and uniaxially oriented thermoplastic films. The best tape for a particular use is determined by the conditions under which the tab will be used. Examples of different uses where the particular tab material, backing and adhesive, must be carefully chosen include high temperatures (microwave cooking), grease, humidity, boiling water, elimination of odor or taste.

A preferred example is a uniaxially oriented polypropylene backing oriented between about 3 to 1 to 10 to 1 and having a synthetic rubber/rein pressure sensitive adhesive.

The present invention has now been described with reference to three embodiments thereof and further alternatives for the means for affording easy manual opening of the enclosure which were described in U.S. Pat. No. 4,664,263. It will be apparent to those skilled in the art that many changes can be made in the embodiments described without departing from the scope of the present invention. Thus the scope of the present invention should not be limited to the structures described in this application, but only by structures described by the language of the claims and their equivalents.

What is claimed is:

1. A pad for use with a food containing a substantial amount of water and solidified grease for cooking of the food in a microwave oven with the pad adapted to be placed adjacent the food to be cooked, the pad comprising:

a plurality of generally microwave radiation transparent and generally hydrophobic grease absorbing microfibers constructed of a composition comprising a blend containing substantially equal parts by weight of polypropylene and poly 4-methylpentene-1.

2. The pad of claim 1, wherein said microfibers are less than 30 microns in diameter.

3. The pad of claim 1, wherein said microfibers are less than 10 microns in diameter.

4. The pad of claim 1, wherein said pad includes first and second major opposing surfaces with said first major surface for placement adjacent the food and further including a second pad comprising generally microwave radiation transparent and generally hydrophobic grease absorbing material, with a major surface of said second pad bonded to said first pad opposite the food, said first and second pads together being capable of absorbing all of the grease exuded by the food during cooking.

5. The pad of claim 4, wherein said second pad is produced from microfibers constructed of a composition comprising a blend containing substantially equal parts by weight of polypropylene and poly 4-methylpentene-1.

6. The pad of claim 1 wherein portions of said pad adjacent the food are thermally embossed.

7. The pad of claim 1, wherein the pad is produced from melt blown microfibers.

* * * * *

UNITED STATES PATENT AND TRADEMARK OFFICE
CERTIFICATE OF CORRECTION

PATENT NO. : 5,041,325

DATED : August 20, 1991

INVENTOR(S) : Larson et al.

It is certified that error appears in the above-identified patent and that said Letters Patent is hereby corrected as shown below:

Title page, item [57], last line of abstract, "propylene" should be --polypropylene--.

Col. 2, line 50, insert --,-- after together.

Signed and Sealed this

Thirteenth Day of July, 1993

Attest:

MICHAEL K. KIRK

Attesting Officer

Acting Commissioner of Patents and Trademarks